United States Patent Office 2,871,126
Patented Jan. 27, 1959

2,871,126

MANUFACTURE OF CHEESE

Augustus B. Smith, Green Bay, Wis., and Miron J. Roberts, Glenview, Donald W. Wagner, Mundelein, and James Bryan Stine, Chicago, Ill., assignors to National Dairy Products Corporation, a corporation of Delaware No Drawing. Application January 19, 1955
Serial No. 482,691

20 Claims. (Cl. 99—116)

The present invention relates generally to the manufacture of cheese of the Swiss or Emmenthaler type, and, more particularly, it relates to improvements in the method of manufacture of such cheese whereby it may be manufactured with greater facility.

For the purpose of this case, a cheese of the Swiss-type is considered to be a cheese made by the Emmenthaler or Swiss process which comprises the following general steps:

(1) Inoculate cow's milk with a culture of such type or types of bacteria as are suitable for producing a cheese having the characteristic nutty flavor of Swiss cheese.

(2) Set or coagulate the milk, usually at a temperature of between 85° and 95° F.

(3) Cut the curd.

(4) Stir the cut curd in the whey and cook it at a temperature of about 120° F. to 133° F.

(5) Separate the curd from the whey.

(6) Press the curd in a form for some hours to eliminate more whey and to permit the curd to become knitted or consolidated.

(7) Salt the curd, e. g., soak the body of curd in brine for a short time, for example, from less than one day to four days, depending upon the size of the body treated, at a relatively low temperature, for example, 40° to 60° F.

(8) Drain the brined body and store it in a cool room, for example, 50° to 60° F., for a short time, e. g., four to fifteen days. The salting and the cold room period cause the surface of the body to become firm and develop a hard, dehydrated layer around the outside of the body.

(9) Store the body in a warm room, for example, 65° to 80° F. for two to six weeks, during which time the body cures, i. e., gases are developed in the body by bacterial action, usually resulting in the formation of cells or "eyes" within the body, the volume of the body expanding during the curing period because of the formation of such cells within the body structure.

The steps which are performed between the time that the curd is cooked and the time the curd is salted have a marked effect upon the ultimate quality of the finished cheese. Prior to this invention, the Swiss cheese maker has always tried to separate the curd from the whey by a draining operation which is carried on with a minimum of manipulation or agitation of the curd, and unless this is properly accomplished the resultant cheese has either inferior eye formation or nests appear in the cheese. (Nests are localized spongy areas comprising numerous minute holes.)

In the time honored method of making Swiss cheese the curd is cooked in a round kettle which has a semi-hemispherical bottom. When a kettle of this type is used, the curd is dipped from the whey in the kettle with a large rectangular net or dip cloth which is worked under the curd by means of a long flexible strap of steel which can be curved to fit the contour of the bottom of the kettle. After the cloth has been worked under the curd, the corners of the cloth are drawn together to form, in effect, a bag by means of which the curd is lifted from the kettle, leaving the greater part of the whey in the kettle. The bag of curd is then immediately placed in a press form, e. g., a circular hoop of about 30 inches in diameter and 5 to 6 inches in height. A circular disk is placed upon the cheese and weight is applied for the purpose of pressing the curd into the shape of a large flat disk. The net or cloth is removed from the curd from time to time, the entire body of curd is turned, fresh cloths are put around it and the press weight is reapplied. The cloth changing and turning is called "dressing" and is repeated from two to seven times over the period of the pressing operation which usually continues overnight or a total of about 18 hours. During the dressing period the remaining free whey drains from the curd slowly and the curd gradually becomes knitted into a homogeneous body. After the pressing period the curd is then placed in the brine tank and finally cured as outlined in the foregoing steps 8 and 9.

From the foregoing description it will be seen that in the traditional Swiss process the body of curd is not manipulated or changed in shape except for the initial change in shape which is effected as quickly as possible incident to the transfer of the curd from the kettle into the press form. Even this change at a period before the curd has appreciably knitted together results in the upper surface of the cheese often having a so-called "streubel" defect and/or nests. Such defects are not desirable in cheeses which are to be sold as premium products. Experience has shown also that the curd must be dipped from the hemispherical kettles in a single dip and this makes it difficult to make cheese in a standard size and weight since the composition of the milk varies from season to season and even from day to day and from source to source so that the yield will vary somewhat for every kettle. As a consequence, it has been found that the weight of individual cheeses made from a given quantity of milk may vary over a range of several pounds from a standard weight which makes it difficult to produce a product of uniform size and weight.

Another method of forming Swiss cheese into a block shape is described in the patent to James Bryan Stine, No. 2,494,637. In the Stine process the curd and whey are pumped into a filter tank in which the curd is formed into a large rectangular bed under a layer of whey, pressure is applied to the curd to effect the desired shape, and the whey is finally drained from around the curd which is permitted to lie undisturbed until it has become knitted and until all of the free whey has drained off, a process which requires a period of from about 4 to 8 hours or longer. This process eliminates many of the difficulties which existed in the prior art methods so long as the curd is not disturbed after the whey is drained from around the curd, but this process requires the use of a number of large and expensive filter tanks for prolonged periods of time in the case of a large scale operation. Further, there still remains the problem of obtaining blocks of uniform weight which are so desirable for cutting and marketing.

The principal object of the present invention is to provide a process wherein the whey may be separated and the cheese may be handled by powered mechanical means, such as, for example, a trommel, or in a curd sink with powered agitators without resulting in an adverse effect upon the finished cheese. Another object of the invention is the provision of a process which may be employed with known curd forming means in the Swiss cheese process to substantially eliminate nests and streubel defects which occur because of the inadequacies of the present methods. A further object of the invention is to provide a process by which units of cheese of substantially uniform weight may be manufactured. Other objects and advantages of the invention will become apparent from the following description of a manner of carrying out the invention.

In accordance with our process, Swiss cheese curd is subjected to a vacuum of at least about 20 inches of mercury and preferably more than about 23 inches of mercury to condition the curd prior to curing. (For the purpose of this case, vacuum is referred to not as absolute pressure but in terms of inches of mercury depression in pressure so that on the basis of absolute pressure with a barometer of 30 inches of mercury the foregoing vacuums of 20 and 23 inches would correspond respectively to pressures of 10 and 7 inches of mercury.) The curd may be subjected to the vacuum at any time in the process prior to the time that the curd particles have substantially lost their tendency or ability to knit and preferably before the curd has become firmly knit together. After the vacuum treatment any further manipulation which might result in a physical disruption of the curd structure is to be avoided. After the treated curd becomes firmly knit together it may be salted, usually by brining, and then cured in one of the normal manners for Swiss cheese.

In following our general procedure, Swiss cheese curd is made in the usual manner for such curd, i. e., by employing substantially steps 1 to 4 outlined generally in the foregoing. After the curd is cooked to the proper degree as determined by the cheese maker, the whey may be separated from the curd in any manner desired, for example, it can be formed and drained in accordance with any of the known ways for draining and forming Swiss cheese curd. However, there is no need to follow the old principle that agitation should be avoided or minimized in the whey separation and forming stages. For example, the curd can be spread upon the foraminous bottom of a curd sink or drain table and agitated with mechanical agitators, passed through a trommel or rotating perforated drum, or any other mechanical means until the major portion of the free whey has been removed. These latter methods are preferable to the old known methods since the draining operation can be accomplished in a short time with mechanical equipment and the curd, in the form of discrete particles, can then be placed in any type of hoop desired, such as, for example, a rectangular expansible metal hoop lined with a suitable bandage such as that employed in making American cheese. Further, the more or less granular curd can be weighed into the hoop by means of a scale so that each cheese will weigh exactly the same amount. This largely eliminates the undesirable variation between the sizes of the cheese which have been prevalent in cheeses made by the prior methods.

The hoop of curd is placed in a vacuum chamber before the curd particles have substantially lost their tendency or ability to knit and preferably before the curd has become firmly knit together, e. g., under normal holding conditions a period less than about five hours after the curd has been separated from the whey. In the vacuum chamber the curd is subjected to a vacuum of at least about 20 inches of mercury and preferably more than 23 inches of mercury. A practical commercial range of operation is at a vacuum ranging from about 25 to 27 inches of mercury.

As has been pointed out, the vacuum should preferably be applied to the curd before the curd has become firmly knit together. Accordingly, the vacuum treatment should preferably be effected as promptly as possible after the curd has been separated from the whey, for example, preferably within a period of from about 60 to 90 minutes after the separation and desirably within 15 to 20 minutes or less. The sooner that the vacuum is applied to the curd after it is separated from the whey the less possibility there is for the curd to have become firmly knitted together. One indication of the progress of knitting is that the application of vacuum of the order referred to above will not have a pronounced expanding effect upon the curd during the vacuum application if the curd has not become appreciably knit together, e. g., curd 15 to 20 minutes after separation from the whey. However, as the knitting progresses somewhat, as, for example, in the 60 to 90 minute period after separation, the curd in the hoop usually expands a considerable amount in volume under the above vacuum conditions, for example, in the case of a hoop of curd measuring 16 by 20 by 7 inches in depth the curd may rise during the vacuum treatment a distance as great as about 5 inches, that is to say, the depth of curd may increase from 7 inches to as much as about 10 to 12 inches, and, as a consequence, the hoop should preferably be designed to accommodate such an expansion. At this stage in knitting, the curd in the vacuum chamber will settle back into its original or into a slightly smaller volume under the action of a weight which will produce a mechanical pressure of the order of 0.2 to 0.65 pound per square inch of top surface area of the hoop. After the curd has become firmly knit, however, as after a longer holding period, the exact length of time will depend to some extent upon holding conditions but under normal room temperature conditions it may become rather firmly knit when it has been held about 5 hours after the time the whey was separated from the curd. The firmly knit curd may expand somewhat under the action of vacuum but for some reason although it becomes knitted after the vacuum treatment for all appearances into a firm solid block, proper eye development does not occur in the curd under curing conditions. Possibly, this is due to the fact that the disruption of the curd structure at this stage may leave small openings or faults in the structure which are not conducive to good eye formation.

As has been before pointed out, while in the vacuum chamber, there may be placed on top of the curd enough weight to produce a slight amount of pressure on the curd which will cause it to settle into a compact body. The exact size of the weight, of course, depends upon the friction involved in the mechanism of the hoop employed and may vary somewhat with different curd conditions, but we have found that with an ordinary standard three-piece stainless steel hoop having a sliding contact between the walls, approximately 0.2 to 0.65 pound per square inch of top surface area is preferred. In some instances, less pressure may be adequate, for example, the weight of the curd or the weight of the hoop itself. Weights, producing pressures of the order of one pound per square inch or above, may be employed but they seem to have no advantage over lower pressures in hoops of the type described.

After the degree of vacuum to be employed has been reached, the curd is held at that degree of vacuum for a short period of time and then the vacuum is released.

It is desirable for the hoop construction to be such that the curd can expand under the influence of the vacuum if some knitting has occurred before the vacuum is applied but this total expansion may be decreased somewhat without harm to the curd by raising the degree of vacuum stepwise, e. g., hold at 15 inches for 5 to 10 minutes, then at 20 inches for 5 to 10 minutes, and finally apply any higher vacuum which may be desired. It is not desirable to prevent the expansion of the curd by mechanical means if the curd has become somewhat knitted.

There appears to be a relationship between the degree of vacuum and the time at which the cheese should be held in the vacuum. For example, cheese may be held for a somewhat shorter period of time at a vacuum of 28 inches of mercury than would be necessary if a vacuum of 23 inches were employed. However, it is preferable to hold the cheese at the desired vacuum level of the magnitude previously indicated for a period which may vary from a short period of the order of a few minutes to a period of about 60 minutes. Longer periods appear to give no advantages. It would appear that the vacuum treatment may be substantially instantaneous if the curd has been separated from the whey immediately before treatment but under commercial operating conditions where the separation has occurred within about a 15 to 60 minute period, periods from approximately 5 to 60 minutes with 85 pound blocks have been highly successful.

With some Swiss cheese curd it has been our experience that too high a vacuum may materially decrease the eye forming tendency in the cheese, for example, in some instances a vacuum of 29 inches has substantially completely eliminated the eye forming properties of the curd. If this should occur and it is not due to bacteriological reasons, the degree of vacuum should be reduced on that type of curd in subsequent batches.

After the vacuum treatment, the curd may be held at room temperature for a period of 10 to 16 hours as is usual in the Swiss cheese making operation before brining. This permits bacterial growth to develop as in the usual procedure. During this time it may be desirable to retain some of the weight upon the block of curd in order to hold the curd in a compacted condition until it becomes firmly knitted. After this holding time, the curd may then be introduced into the brine tank for the usual period of time, e. g., from less than about one day to about four days, or it may be dry salted, a method preferred by a few Swiss cheese makers. After the brining period, the curd may be cured in a rindless state in accordance with the disclosure of Patent No. 2,494,636, or may be cured in accordance with the traditional Swiss cheese curing procedures which involve the laborious turning and salting operations.

*Specific example*

As a specific example of our invention, 10,000 pounds of milk having a fat content of 3.0 percent and a solids-not-fat content such that the curd made therefrom will contain about 47 percent fat on a dry basis is placed in a vat and heated to about 94° F. The milk is inoculated with a mixed culture which includes *Lactobacillus bulgaricus, Streptococcus thermophilus,* and *Propionibacterium shermanii.* If the milk is pasteurized or heat treated before it is inoculated with the culture, a suitable proportion of *Streptococcus lactis* is added to the mixed culture in accordance with normal cheese making practice when pasteurized milk is used. After about 20 minutes the usual amount of rennet is added to the milk. The milk is stirred to mix the rennet in the milk and it is then allowed to set for about 30 minutes.

After the milk has set to the required degree of firmness, it is cut with a harp and the contents of the vat stirred with the harp for 10 minutes. The contents of the vat are then stirred for an additional 10 minutes with an agitator, following which the curd is alternately allowed to settle for periods of time ranging from 3 to 10 minutes and stirred for 5 minutes until one hour after cutting. After this so-called "foreworking period," the alternate stirring and settling, the contents of the vat are heated to about 127° F. in a period of about 30 minutes, during which time the contents of the vat are vigorously stirred with the agitator. This is known as the cooking period. After the cookng temperature of about 127° F. is reached, the curd is vigorously stirred continuously for about 40 minutes.

After cooking, and the cheese maker having determined that the cooking process is completed as a result of testing the physical properties of the curd, the curd is separated from the whey. This is accomplished by pumping the curd and whey mixture onto a drain table measuring about 54 by 234 inches and having a draining area 6 by 180 inches perforated with ⅛ inch holes on ⁹⁄₁₆ inch centers in its horizontal surface to provide rapid draining of the whey. The table is provided with a raised rim which is adapted to retain the curd and whey pumped onto the table. As the curd and whey is pumped onto the perforated surface it is continuously agitated by means of a standard cheese agitator to cause the whey to flow through the perforations in the plate thereby effecting a separation of the whey from the curd. The equipment employed is the same type of equipment as is used in American cheese making.

After the free whey is removed, e. g., in a period of less than about 5 minutes on the table, the curd is hooped. Eighty-seven to one-hundred pounds of the loose curd, depending upon the efficiency of the separation of free whey, but enough to make an 85 pound cheese after curing, is placed in a rectangular cheese hoop measuring 16 by 20 inches in its horizontal cross-section, and being expandable from a height of about 6 to 7 inches to a height of about 12 to 14 inches. The cheese hoop employed is substantially the same in construction as that known in the American cheese art as the Wilson hoop. The hoop is provided with a few perforations and, previous to filling, is lined with a cheese cloth or with a nylon bandage, as is usual in the hooping of American cheese. After the measured amount of curd is scooped or otherwise placed in the hoop, the curd is uniformly distributed in the hoop and the upper surface of the hoop is placed upon the loose curd. A weight of about 150 pounds is then placed on the top of the hoop thus providing a pressure of about .50 pound per square inch over the upper surface of the curd. The weighted hoop is then placed in a vacuum chamber and a vacuum of 26 inches is applied to the curd, this vacuum being held for 60 minutes. The elapsed time between the hooping and the application of vacuum is about 20 minutes. After the vacuum period the block is removed from the vacuum chamber and is held at room temperature overnight or for a period of about 16 hours. During this period the 150 pound weight is retained on top of the block to maintain the curd under pressure.

The next morning the block is placed into the brine tank containing brine substantially saturated with sodium chloride and maintained at a temperature of about 45° F. The block is held in the brine tank for one day, after which it is placed in a cool room maintained at a temperature of about 50° F. for about two days, the relative humidity of the room being about 70 percent. After the two day period, the surface of the block is dry and it is sealed by applying a wrap of moisture-proof, fluid-proof material, such as a thermoplastic film, after which it is placed in a suitable mold and cured in accordance with the procedure outlined in Stine Patent No. 2,494,636.

As will be seen, the process of the invention permits a mechanization of the former laborious processes involved in forming the curd into a body of the desired shape as well as making possible cheeses having a substantially uniform size and weight.

As another example, Swiss curd is prepared in the same manner as in the previous example but instead of separating the curd from the whey on a horizontal screen with mechanical agitation it is deposited in a trommel (a rotating perforated screen). The trommel is provided with suitable baffles to tumble the curd and this trommel is rotated to separate the whey from the curd. After the free whey is removed in this manner the curd is packed into hoops and treated as described in the foregoing.

The size of the cheese is not critical, for example, the curd may be made in approximately 40 to 45 pound sizes, wherein the horizontal cross-sectional area of the hoop is about 150 square inches and in this case a weight of from about 50 to 75 pounds is employed in the vacuum chamber. On the smaller sizes of curd the vacuum may be applied over a period of a few minutes, for example, good results have been obtained with a vacuum of 27–29 inches for a period of 5 minutes. Similarly, in the case of the larger blocks described in the preceding examples, good results have been obtained when the vacuum period is reduced from the 60 minute period employed in the specific example to periods as low as 5 to 30 minutes.

The procedure of this invention is also useful to eliminate defects in curd formed in accordance with the known procedures, i. e., in accordance with the old dip net procedure, or in accordance with the procedure of Stine Patent No. 2,494,637. In this instance, after the curd is formed in accordance with the known procedures the curd before about 3 to 5 hours after dipping is placed in the vacuum chamber with a small weight on it and treated as outlined in the foregoing to prevent or eliminate any nests which may appear in the curd due to improper curd and whey separating procedures. Again, however, it is preferable to apply the vacuum as quickly as possible after the whey has been separated from the curd.

Without the process of this invention, curd which has been separated from the whey by a process which involves agitation and mechanical handling, or the packing of the curd into the hoops while in the form of discrete particles, would result in extremely low quality cheese which in substantially every instance would be unsaleable except for processing because of the inferior eye formation, streubel and/or nests. However, when the process of the invention is employed the eye formation in cheese handled in exactly the same way during the draining and forming stages is normal for high quality cheese.

The reasons for the highly unusual results of the invention are not entirely clear. However, it is believed that at least one of the reasons for the improved results is that a substantial portion of the occluded air is removed from the curd so that a more homogeneous body of curd results. The uniform strength and elasticity of such a homogeneous curd is highly conducive to the production of uniformly distributed eyes of the proper size.

Further, indications are that the vacuum treatment has some effect upon the development of the cheese, since cheese made in accordance with the process of the invention consistently has eyes of a given size at an earlier date than a control which was made in accordance with normal Swiss cheese procedures and then cured in exactly the same manner.

This is a continuation-in-part of our earlier application Serial No. 409,262, filed on February 9, 1954, and assigned to the assignee of this invention.

Various features of the invention which are believed to be new are set forth in the following claims.

We claim:

1. In a process for the manufacture of cheese of the Swiss type, the improvement which comprises subjecting the curd to vacuum before it has lost its ability to knit and before it has become firmly knit, holding the curd to permit it to become firmly knit, applying salt to the exterior surface of the curd, and curing the curd including a period in the warm room to effect the development of the characteristic eyes or holes.

2. In a process for the manufacture of natural cheese of the Swiss type which comprises making curd, forming the curd, and curing the curd, the improvement which comprises subjecting the curd after it is formed into a unit of the desired size to vacuum before it has lost its ability to knit and before it has become firmly knit, holding the curd to permit it to become firmly knit, applying salt to the exterior surface of the curd, and curing the curd including a period in the warm room to effect the development of the characteristic eyes or holes.

3. In a process for the manufacture of natural cheese of the Swiss type which comprises making curd, forming the curd, and curing the curd, the improvement which comprises subjecting the curd after it is formed into a unit of the desired size to vacuum and to a slight mechanical pressure before it has lost its ability to knit and before it has become firmly knit, holding the curd to permit it to become firmly knit, applying salt to the exterior surface of the curd, and curing the curd including a period in the warm room to effect the development of the characteristic eyes or holes.

4. In a process for the manufacture of natural cheese of the Swiss type which comprises making curd, forming the curd, salting the exterior surface of the curd, and curing the curd, the improvement which comprises subjecting the curd prior to salting to vacuum and to mechanical pressure to cause the curd to settle into a compact body before it has lost its ability to knit and before it has become firmly knit, holding the curd to permit it to become firmly knit, applying salt to the exterior surface of the curd, and curing the curd including a period in the warm room to effect the development of the characteristic eyes or holes.

5. In a process for the manufacture of natural cheese of the Swiss type which comprises making curd, forming the curd, and curing the curd, the improvement which comprises subjecting the curd after it is formed into a unit of the desired size to vacuum to effect the removal of a substantial portion of the occluded gases in said curd before the curd has lost its ability to knit and before it has become firmly knit, holding the curd to permit it to become firmly knit, applying salt to the exterior surface of the curd, and curing the curd including a period in the warm room to effect the development of the characteristic eyes or holes.

6. In a process for the manufacture of natural cheese of the Swiss type which comprises making curd, forming the curd, and curing the curd, the improvement which comprises subjecting the curd after it is formed into a unit of the desired size to a vacuum of at least 20 inches of mercury before the curd has lost its ability to knit and before it has become firmly knit, holding the curd to permit it to become firmly knit, applying salt to the exterior surface of the curd, and curing the curd including a period in the warm room to effect the development of the characteristic eyes or holes.

7. In a process for the manufacture of natural cheese of the Swiss type which comprises making curd, forming the curd, and curing the curd, the improvement which comprises subjecting the curd after it is formed into a unit of the desired size to a vacuum of at least 20 inches of mercury and to mechanical pressure to cause the curd to settle into a compact body incident to said vacuum treatment, said vacuum treatment being applied before the curd has lost its ability to knit and before it has become firmly knit, holding the curd to permit it to become firmly knit, applying salt to the exterior surface of the curd, and curing the curd including a period in the warm room to effect the development of the characteristic eyes or holes.

8. In a process for the manufacture of natural cheese of the Swiss type which comprises making curd, forming the curd, and curing the curd, the improvement which comprises subjecting the curd after it is formed into a unit of the desired size to a vacuum of at least 23 inches of mercury before the curd has lost its ability to knit and before it has become firmly knit, holding the curd to permit it to become firmly knit, applying salt to the exterior surface of the curd, and curing the curd including a period in the warm room to effect the development of the characteristic eyes or holes.

9. In a process for the manufacture of natural cheese of the Swiss type which comprises making curd, forming the curd, and curing the curd, the improvement which comprises subjecting the curd after it is formed into a unit of the desired size to a vacuum of at least 23 inches of mercury and to mechanical pressure to cause the curd to settle into a compact body, said vacuum treatment being applied before the curd has lost its ability to knit and before it has become firmly knit, holding the curd to permit it to become firmly knit, applying salt to the exterior surface of the curd, and curing the curd including a period in the warm room to effect the development of the characteristic eyes or holes.

10. In a process for the manufacture of natural cheese of the Swiss type which comprises making curd, forming the curd, and curing the curd, the improvement which comprises subjecting the curd after it is formed into a unit of the desired size to a vacuum of at least 20 inches of mercury to effect the removal of a substantial portion of the occluded gases in said curd and to mechanical pressure to cause the curd to settle into a compact body, said vacuum treatment being applied before the curd has lost its ability to knit and before it has become firmly knit, said pressure being applied while said curd is under vacuum, holding the curd to permit it to become firmly knit, applying salt to the exterior surface of the curd, and curing the curd including a period in the warm room to effect the development of the characteristic eyes or holes.

11. In a process for the manufacture of natural cheese of the Swiss type which comprises making curd, forming the curd, and curing the curd, the improvement which comprises subjecting the curd after it is formed into a unit of the desired size to a vacuum of at least 23 inches of mercury to effect the removal of a substantial portion of the occluded gases in said curd and to mechanical pressure to cause the curd to settle into a compact body, said vacuum treatment being applied before the curd has lost its ability to knit and before it has become firmly knit, said pressure being applied while said curd is under vacuum, holding the curd to permit it to become firmly knit, applying salt to the exterior surface of the curd, and curing the curd including a period in the warm room to effect the development of the characteristic eyes or holes.

12. A process for the manufacture of natural cheese of the Swiss type comprising the steps of making Swiss curd, separating the free whey from the curd by mechanical means involving agitation which maintain the curd in particle form, placing the curd in a mold of the desired size, subjecting the curd before it has lost its ability to knit and before it has become firmly knit to a vacuum of at least 20 inches of mercury and to mechanical pressure to cause the curd to settle into a compact body while under vacuum, holding the curd to permit it to become firmly knit, applying salt to the exterior surface of the curd, and curing the curd including a period in the warm room to effect the development of the characteristic eyes or holes.

13. A process for the manufacture of cheese of the Swiss type comprising the steps of making Swiss curd, separating free whey from the curd, placing the curd in a mold of the desired size, promptly subjecting the curd to vacuum after the separation of free whey to effect the removal of a substantial portion of the occluded gases in said curd, holding the curd to permit it to become firmly knit, applying salt to the exterior surface of the curd, and curing the curd including a period in the warm room to effect the development of the characteristic eyes or holes.

14. A process for the manufacture of cheese of the Swiss type comprising the steps of making Swiss curd, separating free whey from the curd by mechanical means involving agitation which maintain the curd in particle form, placing the curd in a mold of the desired size, subjecting the curd before it has lost its ability to knit and before it has become firmly knit to vacuum to effect the removal of a substantial portion of the occluded gases in said curd and to mechanical pressure to cause the curd to settle into a compact body while under vacuum, holding the curd to permit it to become firmly knit, applying salt to the exterior surface of the curd, and curing the curd including a period in the warm room to effect the development of the characteristic eyes or holes.

15. A process for the manufacture of cheese of the Swiss type comprising the steps of making Swiss curd, separating free whey from the curd by mechanical means involving agitation which maintain the curd in particle form, placing the curd in a mold of the desired size, subjecting the curd before it has lost its ability to knit and before it has become firmly knit to a vacuum of at least 23 inches of mercury to effect the removal of a substantial portion of the occluded gases and to mechanical pressure to cause said curd to settle into a compact body while under vacuum, holding the curd to permit it to become firmly knit, applying salt to the exterior surface of the curd, and curing the curd including a period in the warm room to effect the development of the characteristic eyes or holes.

16. A process for the manufacture of cheese of the Swiss type comprising the steps of making Swiss curd, separating the free whey from the curd by mechanical means involving agitation which maintain the curd in particle form, placing the curd in a mold of the desired size, subjecting the curd before it has lost its ability to knit and before it has become firmly knit to a vacuum of at least 23 inches of mercury to effect the removal of a substantial portion of the occluded gases and to a slight mechanical pressure but less than an amount which will prevent expansion of said curd under the influence of the vacuum, said mechanical pressure being applied to said curd prior to the release of said vacuum, holding the curd to permit it to become firmly knit, applying salt to the exterior surface of the curd, and curing the curd including a period in the warm room to effect the development of the characteristic eyes or holes.

17. A process for the manufacture of cheese of the Swiss type comprising the steps of making Swiss curd, separating the free whey from the curd by mechanical means involving agitation which maintain the curd in particle form, placing the curd in a mold of the desired size, subjecting the curd within five hours after the whey has been separated therefrom to a vacuum of at least 23 inches of mercury for a short period of time and to a mechanical pressure of more than 0.2 pound per square inch but less than an amount which will prevent expansion of said curd under the action of said vacuum, said mechanical pressure being applied to compact said curd before it is removed from the vacuum, holding the curd to permit it to become firmly knit, applying salt to the exterior surface of the curd, and curing the curd including a period in the warm room to effect the development of the characteristic eyes or holes.

18. A process for the manufacture of cheese of the Swiss type comprising the steps of making Swiss curd, separating the free whey from the curd by mechanical means involving agitation which maintain the curd in particle form, placing the curd in a mold of the desired size, subjecting the curd within a period of 90 minutes after the w..ey has been separated therefrom to a vacuum of at least 23 inches of mercury for between about 5 and 60 minutes and before said vacuum is released to a mechanical pressure of between 0.2 and 0.65 pound per square inc.i, i o.d ng the curd to permit it to become firmly knit, applying salt to the exterior surface of the curd, and curing the curd including a period in the warm room to effect the development of the characteristic eyes or holes.

19. A process for the manufacture of cheese of the Swiss type comprising the steps of making Swiss curd, separating the free whey from the curd by mechanical means involving agitation which maintain the curd in particle form, placing the curd in a mold of the desired size, subjecting the curd within a period of about 20 minutes after the whey has been separated therefrom to a vacuum of at least 23 inches of mercury for between about 15 and 60 minutes and before said vacuum is released to a mechanical pressure of between 0.2 and 0.65 pound per square inch, holding the curd to permit it to become firmly knit, applying salt to the exterior surface of the curd, and curing the curd including a period in the warm room to effect the development of the characteristic eyes or holes.

20. In a process for the manufacture of natural cheese of the Swiss type which comprises the steps of making Swiss curd, separating the whey from the curd, forming the curd, and subjecting the formed curd to a vacuum in excess of 20 inches of mercury promptly after separation of the whey from the curd, holding the curd to permit it to become firmly knit, applying salt to the exterior surface of the curd, and curing the curd including a period in the warm room to effect the development of the characteristic eyes or holes.

References Cited in the file of this patent
UNITED STATES PATENTS

| | | |
|---|---|---|
| 567,522 | Turner | Sept. 8, 1896 |
| 2,424,693 | Jones | July 29, 1947 |
| 2,471,867 | Fisher et al. | May 31, 1949 |

FOREIGN PATENTS

| | | |
|---|---|---|
| 22,264 | Australia | Apr. 16, 1935 |

OTHER REFERENCES

U. S. D. A. Bulletin 608, Varieties of Cheese, March 6, 1918, pp. 16 thru 18.

U. S. D. A. Handbook No. 54, Cheese Varieties, December 1953, pp. 124 thru 126.